(12) United States Patent
Meyer et al.

(10) Patent No.: US 11,980,269 B2
(45) Date of Patent: May 14, 2024

(54) LIGHTWEIGHT FRAME ASSEMBLIES AND ASSOCIATED METHODS

(71) Applicant: Osprey Packs, Inc., Cortez, CO (US)

(72) Inventors: Michael J. Meyer, Highlands Ranch, CO (US); James J. Matthews, Erie, CO (US); Paul Fair, Denver, CO (US); Jamie Kummerfeld, Greeley, CO (US); Hanh Doan, Ho Chi Minh (VN)

(73) Assignee: OSPREY PACKS, INC., Cortez, CO (US)

( * ) Notice: Subject to any disclaimer, the term of this patent is extended or adjusted under 35 U.S.C. 154(b) by 117 days.

(21) Appl. No.: 17/530,218

(22) Filed: Nov. 18, 2021

(65) Prior Publication Data

US 2022/0175104 A1   Jun. 9, 2022

Related U.S. Application Data

(60) Provisional application No. 63/121,190, filed on Dec. 3, 2020.

(51) Int. Cl.
*A45C 13/04*   (2006.01)
(52) U.S. Cl.
CPC .................................. *A45C 13/04* (2013.01)
(58) Field of Classification Search
CPC ......... A45C 13/04; A45C 3/00; A45C 13/385; B62B 3/02
See application file for complete search history.

(56) References Cited

U.S. PATENT DOCUMENTS

| | | | | |
|---|---|---|---|---|
| 6,148,973 A | * | 11/2000 | Chang | A45C 5/14 190/115 |
| 6,357,567 B1 | * | 3/2002 | Tsai | A45C 5/14 190/103 |
| 8,172,241 B2 | * | 5/2012 | Salvucci, Jr. | B62B 3/104 280/47.35 |
| 8,191,908 B2 | * | 6/2012 | Udall | A45C 13/04 280/655 |
| 8,662,268 B2 | * | 3/2014 | Keir | A45C 13/04 190/122 |
| 10,791,809 B2 | * | 10/2020 | Meersschaert | A45C 5/14 |

(Continued)

FOREIGN PATENT DOCUMENTS

| | | |
|---|---|---|
| CN | 201445050 | 5/2010 |
| EP | 3590381 | 1/2020 |

(Continued)

OTHER PUBLICATIONS

European Search Report filed in EP21211756 dated Apr. 5, 2022.
Trimmers Co., Ltd., 2016 Catalog, front cover, publicly available as of 2016, 1 pg.

*Primary Examiner* — Don M Anderson
*Assistant Examiner* — Justin Caudill
(74) *Attorney, Agent, or Firm* — Rankin, Hill & Clark LLP

(57) ABSTRACT

The present disclosure is directed to a frame assembly. The frame assembly includes, for example, a bottom support structure, a handle housing coupled to the bottom support structure, a holder coupled to the handle housing, and a diagonal support structure diagonally positioned and coupled to the handle housing via the holder. The handle housing, the holder, and the diagonal support structure together form an integrated structure.

30 Claims, 12 Drawing Sheets

(56) References Cited

U.S. PATENT DOCUMENTS

| | | | |
|---|---|---|---|
| 2004/0231939 A1* | 11/2004 | Miyoshi | B62B 5/085 16/113.1 |
| 2009/0071781 A1* | 3/2009 | Lee | A45C 13/262 190/107 |
| 2011/0162931 A1* | 7/2011 | Collins | A45C 7/0063 190/103 |
| 2012/0024649 A1* | 2/2012 | Lai | A45C 5/02 190/24 |
| 2016/0029763 A1* | 2/2016 | Meersschaert | A45C 13/04 190/122 |
| 2016/0135558 A1* | 5/2016 | Selvi | A45C 5/14 112/475.08 |

FOREIGN PATENT DOCUMENTS

| | | | |
|---|---|---|---|
| FR | 2422538 | 11/1979 | |
| WO | WO-2019162686 A1 * | 8/2019 | A45C 13/04 |

* cited by examiner

LIGHTWEIGHT FRAME ASSEMBLIES AND ASSOCIATED METHODS

CROSS REFERENCE TO RELATED APPLICATIONS

This application claims priority to U.S. Provisional Patent Application No. 63/121,190, filed Dec. 3, 2020, entitled "LIGHTWEIGHT FRAME ASSEMBLIES AND ASSOCIATED METHODS," the entire disclosure of which is herein incorporated by reference.

TECHNICAL FIELD

The present technology is directed to a structure for supporting and carrying an object. More particularly, a frame assembly for supporting and carrying a bag and associated methods for assembling the frame assembly are disclosed herein.

BACKGROUND

A frame assembly can be used to carry a luggage bag. Some luggage bags are soft and therefore require some structural support from the frame assembly. To provide sufficient structural support, traditional frame assemblies usually include a bottom pan or frame and a plurality of panel components of the luggage bag to be carried. Additionally, the panel components of a traditional luggage bag include individual panel frames. These traditional frame assemblies can be heavy, difficult to maneuver, and expensive. Therefore, it is advantageous to have an improved frame assembly to address these issues.

BRIEF DESCRIPTION OF THE DRAWINGS

Non-limiting and non-exhaustive examples are described with reference to the following figures.

DETAILED DESCRIPTION

Various aspects of the disclosure are described more fully below with reference to the accompanying drawings, which form a part hereof, and which show specific exemplary aspects. Different aspects of the disclosure may be implemented in many different forms and should not be construed as limited to the aspects set forth herein. Rather, these aspects are provided so that this disclosure will be thorough and complete, and will fully convey the scope of the aspects to those skilled in the art. The following detailed description is, therefore, not to be taken in a limiting sense.

The present technology is directed to a lightweight frame assembly and associated methods for manufacturing or assembling the frame assembly. The frame assembly is configured to carry and/or support a "soft" bag such as a backpack, a luggage, a travel bag, etc. The frame assembly provides structural support to the soft bag and enhances the portability and/or maneuverability of the soft bag. The frame assembly is "lightweight" compared to traditional ones at least due to its unique structure and design.

The frame assembly can include a bottom support structure, a handle housing, a holder, and a diagonal support structure. The handle housing has a top end and a bottom end. The bottom end of the handle housing is coupled to the bottom support structure. The top end of the handle housing is coupled to the holder. The diagonal support structure is diagonally positioned (e.g., forming an acute angle relative to the handle housing) and coupled to the handle housing via the holder. The diagonal support structure is also coupled to the bottom support structure. The diagonal support structure coupled to the soft bag, such as, for example, by sleeves or clips attached to seams of the soft bag. Alternatively, in certain embodiments, the diagonal support structure may be inserted into the soft bag so as to provide structural support.

Although described as a diagonal support structure, the diagonal support structure in certain embodiments may not have a diagonal section, which will be explained further below. In certain aspects, the diagonal support structure may be referred to as a front wheel stability transference structure. The front wheel stability transference structure transfers the stability from the rear vertical support, which is the handle housing, to the front wheel assemblies via the structure.

Figure 1A:
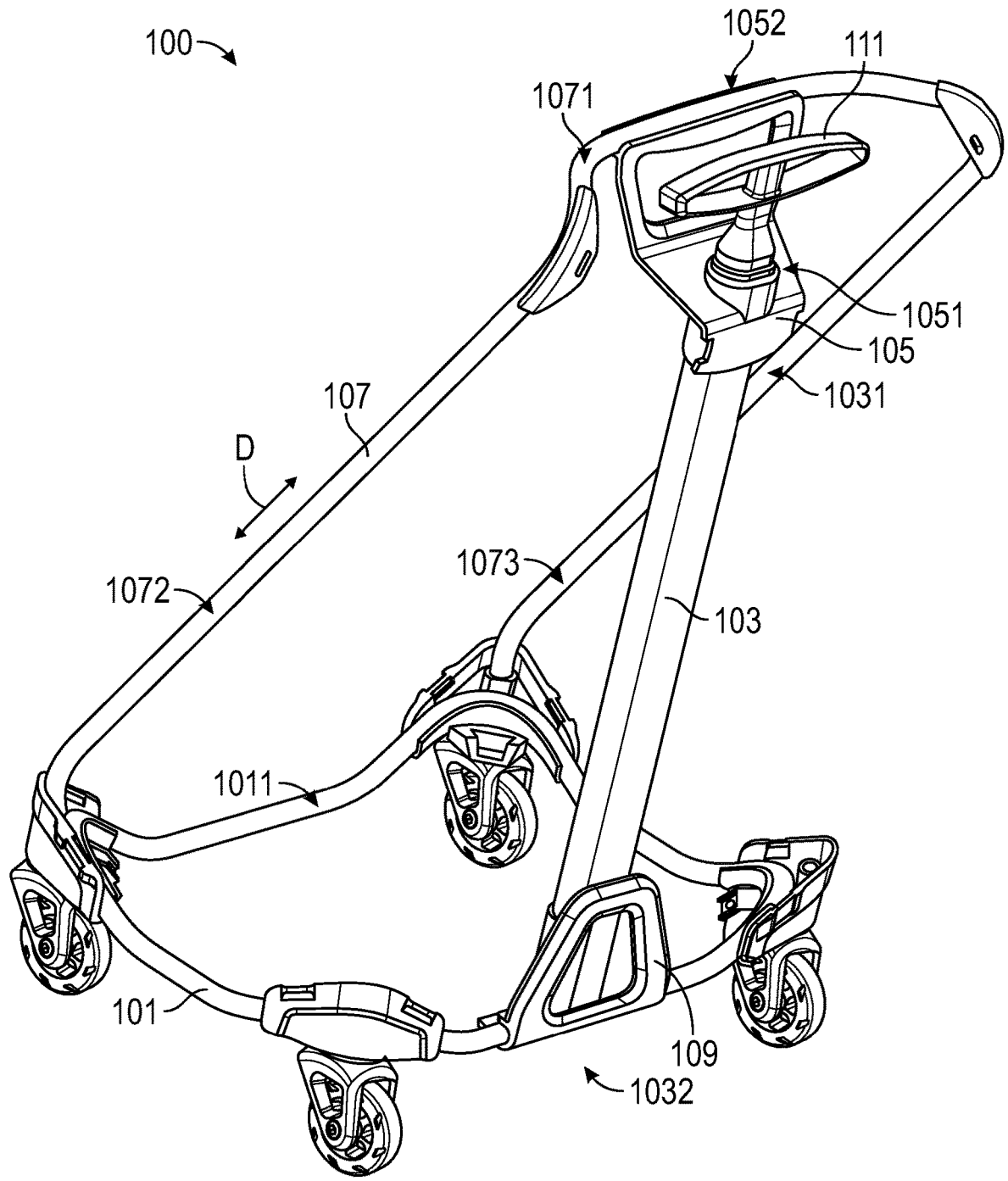
FIG. 1A is an isometric view of a frame assembly in accordance with embodiments of the present technology.

FIG. 1A is an isometric view of a frame assembly 100 in accordance with embodiments of the present technology. The frame assembly 100 includes a bottom support structure 101, a handle housing 103, a holder 105, and a diagonal support structure 107. The handle housing 103 has a top end 1031 and a bottom end 1032. The bottom end 1032 is coupled to the bottom support structure 101. As shown, a bottom molded piece 109, sometimes referred to as a kickplate in the industry, is positioned to couple the bottom support structure 101 and the handle housing 103. In some embodiments, the bottom support structure 101 can be a single-piece structure with two ends. In such embodiments, the two ends of the bottom support structure 101 can be coupled by the bottom molded piece 109. For example, as shown in FIG. 1A, the bottom molded piece 109 may be formed with open tubes, blind holes, or female connections to receive the tubes of the bottom support structure 101.

As shown in FIG. 1A, the top end 1031 of the handle housing 103 is coupled to the holder 105. The holder 105 is formed with an aperture 1051 to receive the handle housing 103. The holder 105 is also formed with a recess 1052 configured to accommodate and hold an upper portion 1071 of the diagonal support structure 107. The upper portion 1071 generally traverses the width of the frame assembly 100.

In addition to the upper portion 1071, the diagonal support structure 107 also includes two diagonal portions 1072, 1073. The two diagonal portions 1072, 1073 are positioned in parallel in a diagonal direction D. The two diagonal portions 1072, 1073 extend from the upper portion 1071, which is oriented over the back side 1012 (see FIG. 1B) toward a front side 1011 of the bottom support structure 101, which is oriented over the front wheel assemblies 113a, 113b (see FIG. 1B). By this arrangement, the diagonal support structure 107 is diagonally positioned relative to the handle housing 103 and coupled to the bottom support structure 101 at the front side 1011 of the bottom support structure. The left and right ends of the diagonal portions 1072, 1073 may be oriented vertically with respect to the bottom support structure 101 to facilitate connection, as explained below. In certain aspects, the diagonal support structure 107 provides tension/compression to the frame assembly to maintain the shape of a soft bag and stability of the front wheel assemblies 113a and 113b during use. As a result, the handle housing 103, the holder 105, the diagonal support structure 107 together form an integrated structure that is coupled to the bottom support structure 101, thereby creating a rigid structure that can be used to support or carry a soft bag (an example of the soft bag is shown in FIG. 2A). The holder 105 may be exposed to a user's grip in certain soft bags such that it constitutes an integrated strap.

As mentioned above, the diagonal support structure 107 may be considered, in certain aspects, a front wheel stability transference structure 107. In this case, the two parallel diagonal portions may, in certain aspects, approach a vertical configuration such that the diagonal portions are in fact vertical portions. In this case, the left and right ends that are oriented vertically with respect to the bottom support structure 101 may extend a height of the soft bag. Thus, the front wheel stability transference support structure 107 extends, symmetrically from the vertical handle housing 103, the transverse width of the bag, bends at a right angle and extends a length of the bag in a front to back direction, and bends at a right angle and extends the height of the bag to the bottom support structure 101.

The handle housing 103 is configured to receive or accommodate an extendable pull handle (not shown in FIG. 1; see e.g., element 401 in FIG. 4) therein. The extendable pull handle can be coupled to a handle grip 111 for a user to hold and move/maneuver the frame assembly 100. The handle housing 103, the extendable pull handle, and the handle grip 111 are included in a handle assembly (e.g., element 400 in FIG. 4), which is discussed in detail below with reference to FIG. 4.

Figure 1B:
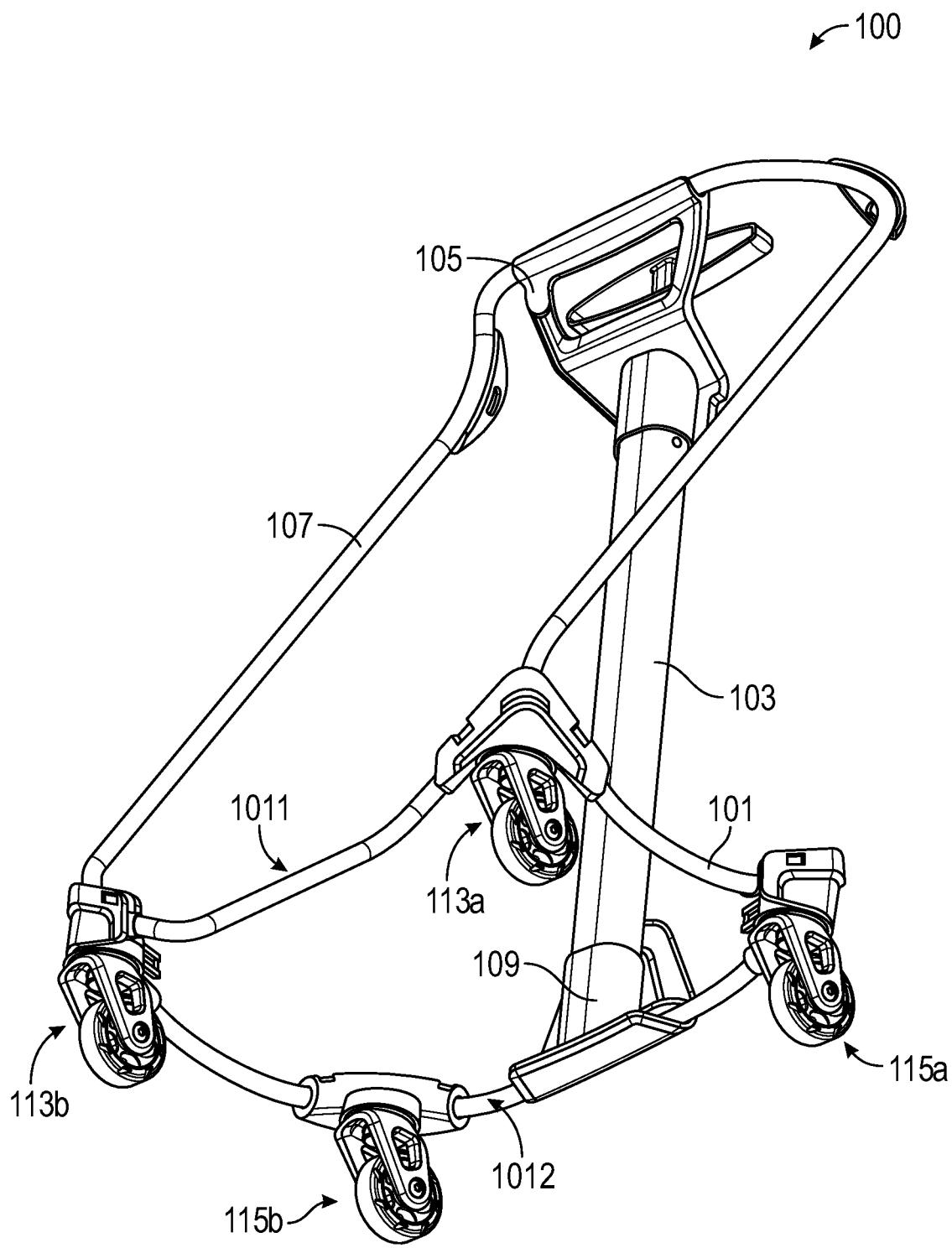
FIG. 1B is another isometric view of the frame assembly in accordance with embodiments of the present technology.
Figure 2A:
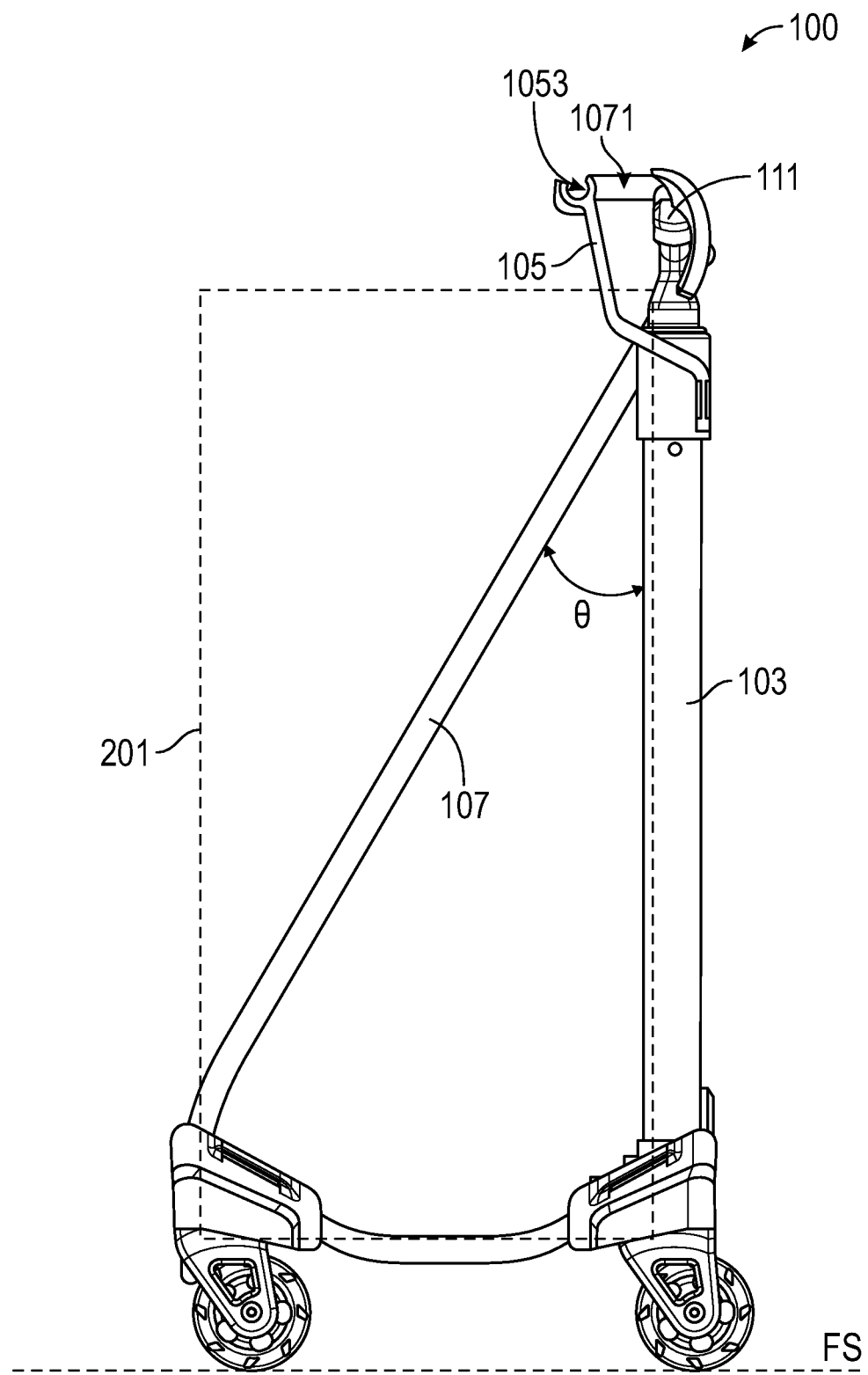
FIGS. 2A-2B are side views of the frame assembly in accordance with embodiments of the present technology.

FIG. 1B is another isometric view of the frame assembly 100 in accordance with embodiments of the present technology. The frame assembly 100 includes two front wheel assemblies 113a, 113b coupled to the front side 1011 of the bottom support structure 101. At a back side 1012 of the bottom support structure 101, two back wheel assemblies 115a, 115b are coupled to the bottom support structure 101. While shown with two front wheel assemblies 113a, 113b, the front wheel assemblies may be replaced with feet or sliders. Generally, the frame assembly 100 is tilted onto the two back wheel assemblies 115a, 115b while the frame assembly 100 is being moved. Thus, the two front wheel assemblies 113a, 113b may be replaced for certain embodiments. The feet would allow for stability while the frame assembly was resting on a flat surface. Embodiments of the wheel assemblies 113, 115 are discussed below with reference to FIG. 5.

Figure 2B:
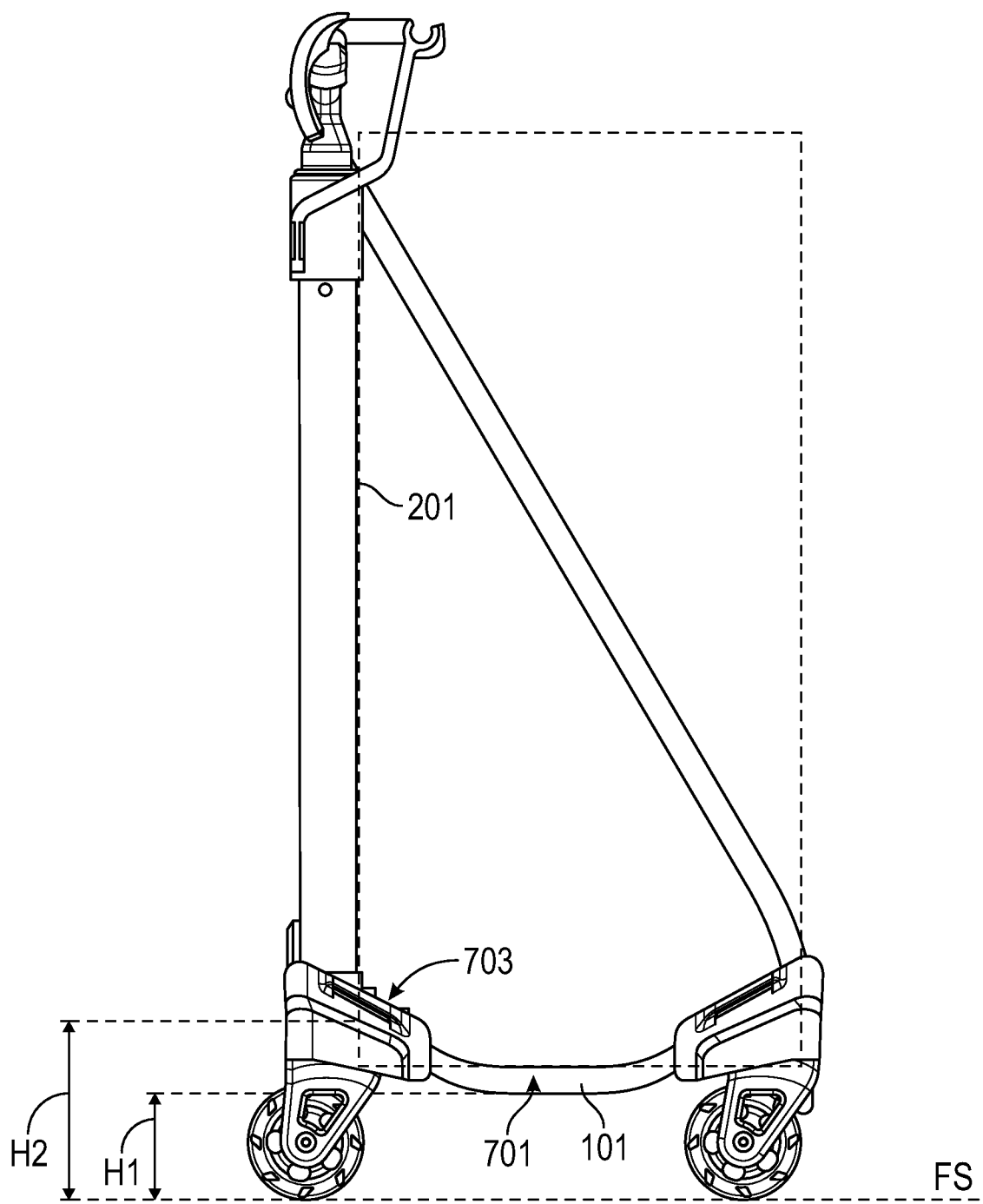
Figure 9:
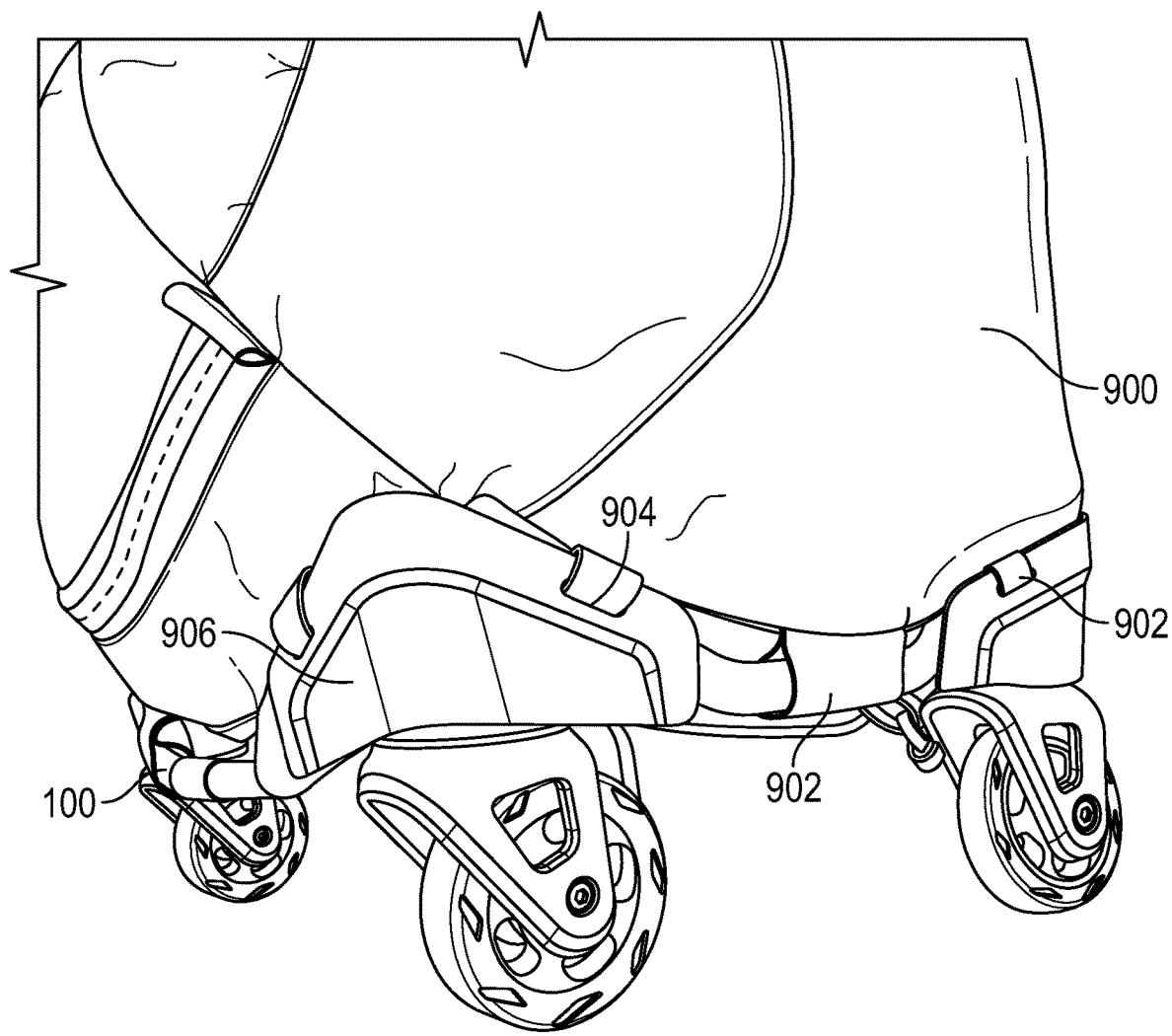
FIG. 9 is a diagram of an exemplary connection between a soft bag and the frame assembly of FIG. 1 in accordance with embodiments of the present technology.

FIGS. 2A-2B are side views of the frame assembly 100 in accordance with embodiments of the present technology. FIG. 2A is a left-side view of the frame assembly 100. The frame assembly 100 is configured to carry a soft bag 201. The diagonal support structure 107 can be coupled to the soft bag 201 (e.g., at both sides of the soft bag 201) to provide structural support thereto. In certain embodiments, sleeves are coupled, such as via stitching, to the seams of the soft bag 201. The tubes of the frame assembly 100 are placed into the sleeves. In other embodiments, clips are coupled to the seams of the soft bag 201 and the clips are coupled to slots in the frame assembly 100. In still other embodiments, the frame assembly 100 may be inserted into the storage space of the soft bag 201 to provide structural stability to the soft bag. FIG. 9 shows an exemplary connection of a soft bag 900 to the frame assembly 100. Webs of material 902 forming tubes or sleeves are attached to the seams of the bag, such as by stitching. The web 902 wraps around a tubular frame parts of the frame assembly 100 or, in certain embodiments, is threaded through slots 904 in molded parts 906. The diagonal support structure 107 forms an acute angle, and up to an including a right angle, ⊖ relative to the handle housing 103. In some embodiments, the range of the angle ⊖ can be from 20 to 90 degrees, depending on various designs, specifically based on the height and depth of the soft bag.

When the soft bag 201 is positioned as shown in FIG. 2A, a user can move the soft bag 201 and the frame assembly 100 on a floor surface FS by holding the handle grip 111 or, in certain embodiments, the holder 105. In the illustrated embodiment, a top surface 1053 of the holder 105 is generally flush with the handle grip 111. The top surface 1053 of the holder 105 is also generally flush with the upper portion 1071 of the diagonal support structure 107. This configuration enables the user to conveniently store the frame assembly 100 in a narrow storage space.

FIG. 2B is a right-side view of the frame assembly 100. Referring to both FIG. 2B and FIG. 7, the bottom support structure 101 includes a flat portion 701 and a curved portion 703. In FIG. 2B, the distance from the flat portion 701 to the floor surface FS is "$H_1$" and the distance from the curved portion 703 to the floor surface FS is "$H_2$." As shown in FIG. 2B, distance $H_1$ is smaller than distance $H_2$. The flat portion 701 provides a larger storage space for the soft bag 201, compared to traditional frames.

Figure 2C:
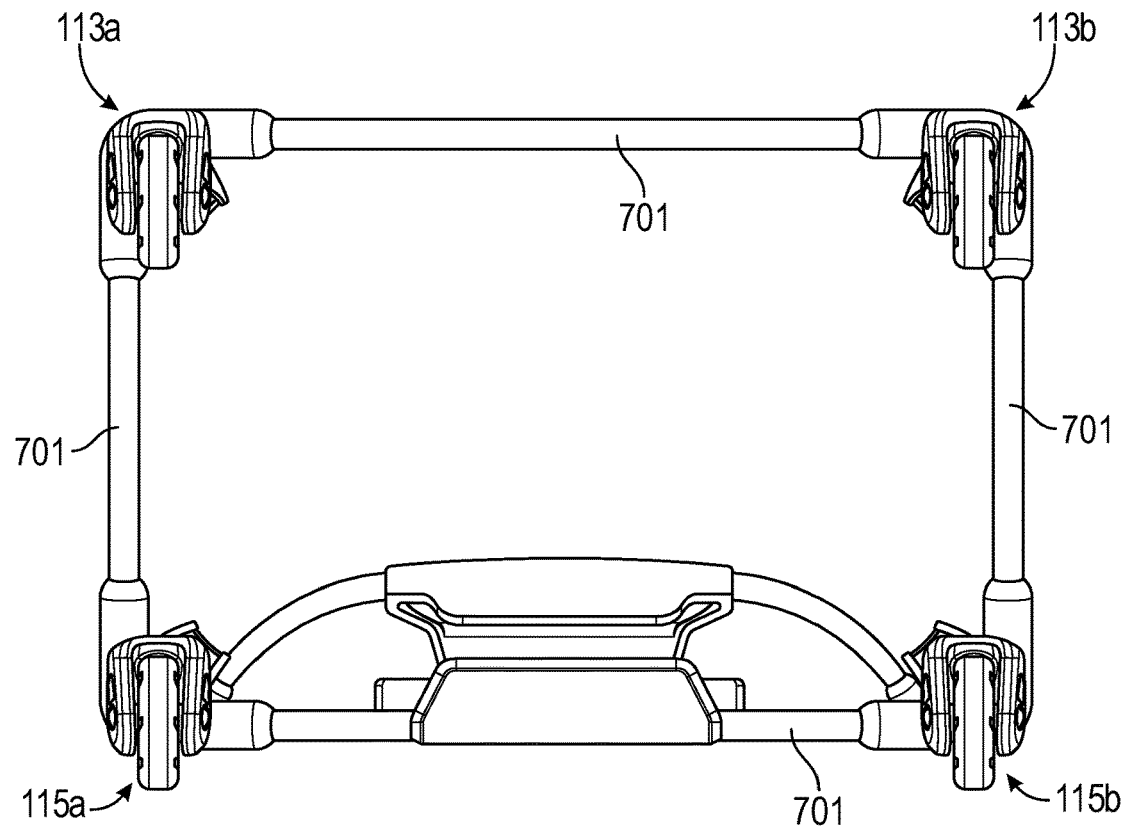
FIG. 2C is a bottom view of the frame assembly in accordance with embodiments of the present technology.
Figure 2D:
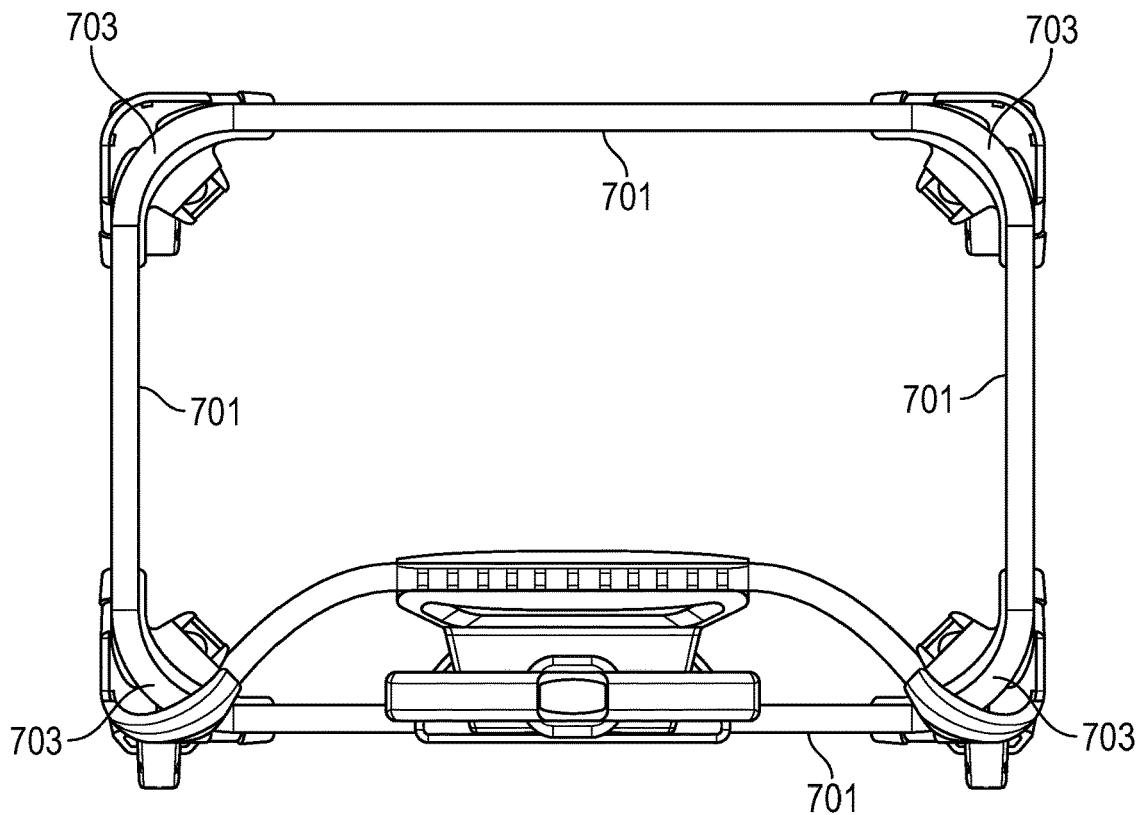
FIG. 2D is a top view of the frame assembly in accordance with embodiments of the present technology.

FIGS. 2C and 2D are bottom and top views of the frame assembly 100 in accordance with embodiments of the present technology. In FIG. 2C, only the flat portions 701 of the bottom support structure 101 can be seen from the bottom. In FIG. 2D, the curved portions 703 can be seen from the top. The curved portion 703 is "curved" both in a horizontal plane (as shown in FIG. 2D) as well as in a vertical plane (see FIGS. 3 and 7).

Figure 3:
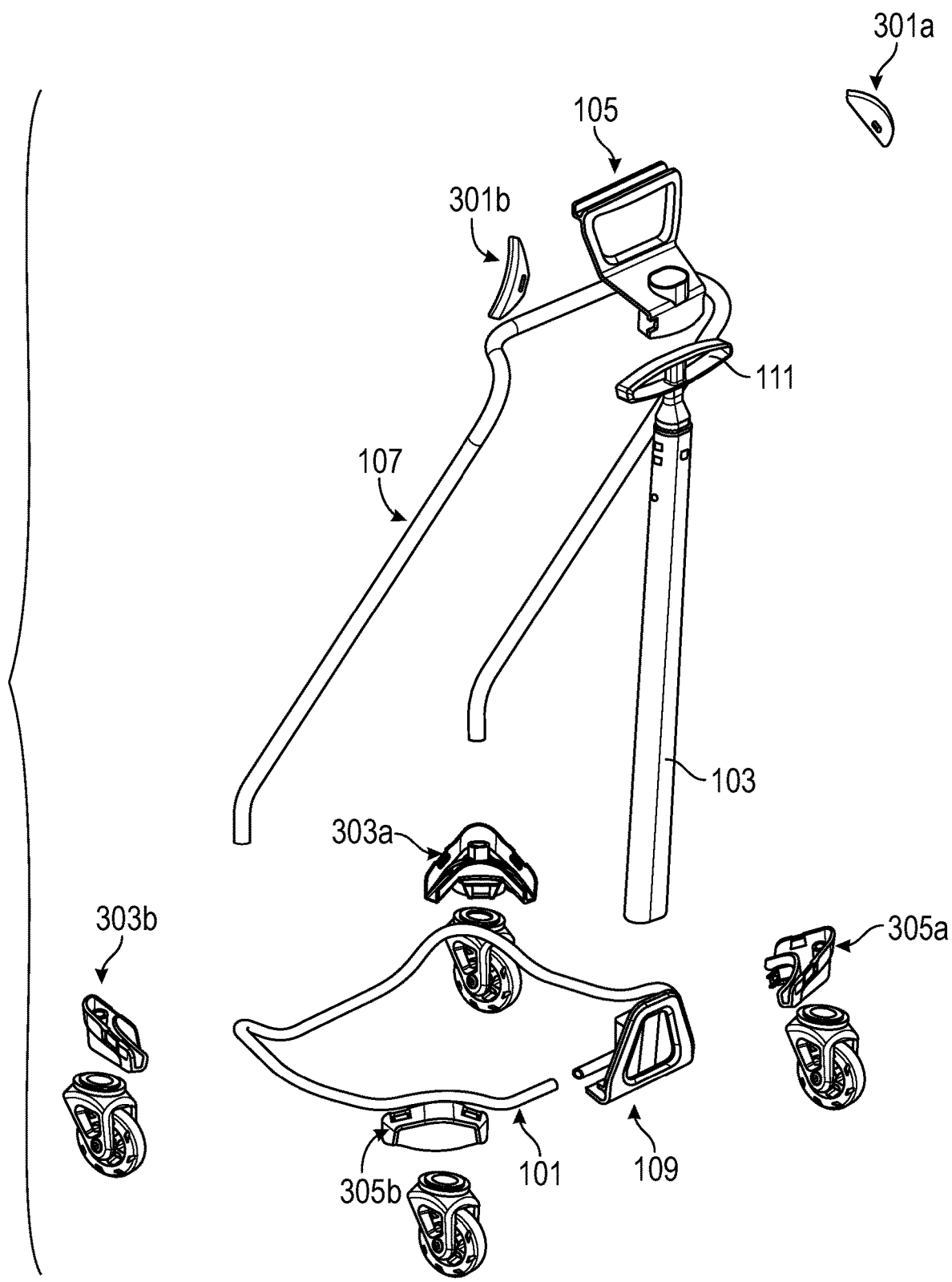
FIG. 3 is an exploded view of the frame assembly in accordance with embodiments of the present technology.

FIG. 3 is an exploded view of the frame assembly 100 in accordance with embodiments of the present technology. As shown, the frame assembly 100 can include corner protectors 301a, 301b configured to protect the diagonal support structure 107. In the illustrated embodiment, the diagonal support structure 107 is a single-piece structure, which forms an inverted and canted U shape. The bottom support structure 101 is also a single-piece structure in this embodiment. The diagonal support structure 107 is coupled to the bottom support structure 101 by two front wheel assemblies 303 (shown as 303a, 303b in FIG. 3). The frame assembly 100 also includes two back wheel assemblies 305 (shown as 305a, 305b in FIG. 3) to support the bottom support structure 101. The front and back wheel assemblies 303, 305 can be further coupled to corresponding wheels. Embodiments of the wheel assemblies 303, 305 are discussed below with reference to FIG. 5. The diagonal support structure 107 has a generally vertical bottom tubular portion that fits into a blind hole, which is sized to cooperatively engage the vertical tubular portion, on the wheel assemblies 303. The back wheel assemblies 305 do not require the blind holes, but are molded to be identical to the front wheel assemblies for convenience. Additionally, other fitting arrangements are possible.

Figure 11:
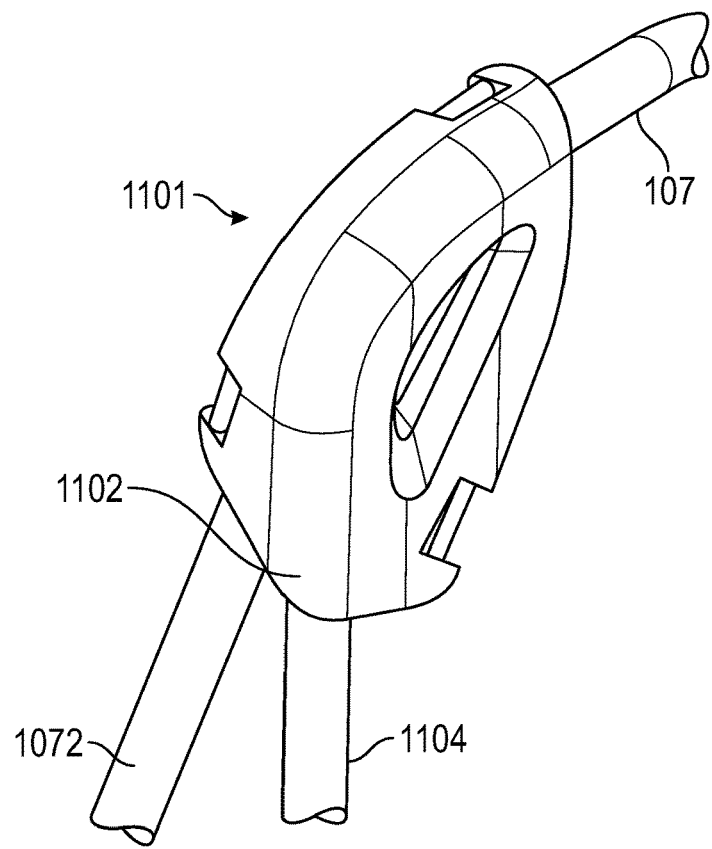
FIG. 11 is a diagram of an alternative embodiment of a corner protector with a rear vertical frame support in accordance with embodiments of the present technology.

FIG. 11 shows an alternative corner protector 1101, which could be used in place of either or both corner protectors 301a and 301b described above. The corner protector 1101 is similar to the corner protectors 301a, 301b, but includes a vertical socket 1102 to receive a rear vertical frame support 1104. The rear vertical frame support 1104 would extend downward from the protector 1101 and couple to the back wheel assemblies, such as back wheel assemblies 115a, 115b

Figure 4:
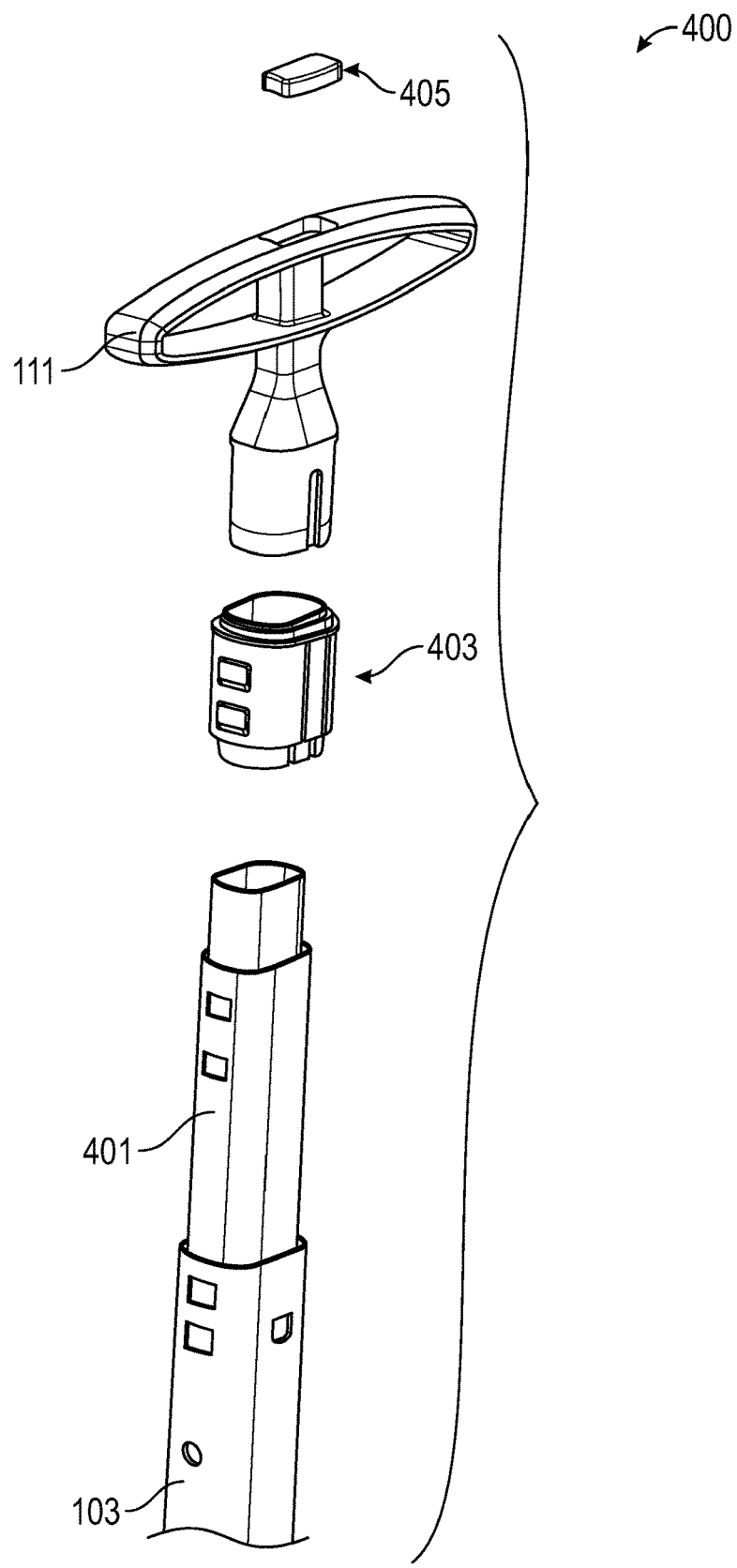
FIG. 4 is an exploded, partial isometric view of a handle assembly in accordance with embodiments of the present technology.
Figure 10:
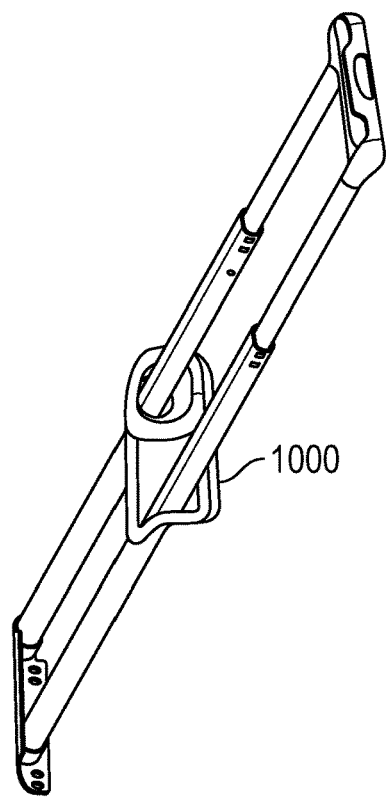
FIG. 10 is a diagram of an alternative embodiment of a handle assembly in accordance with embodiments of the present technology.

FIG. 4 is an exploded, isometric view of a handle assembly 400 in accordance with embodiments of the present technology. The handle assembly 400 includes an extendable pull handle 401 operably positioned in the handle housing 103 and extending out of the handle housing 103 when being pulled. The extendable pull handle 401 is coupled to the handle grip 111 by a connector 403. The handle assembly 400 can also include a handle cap 405 attached to the handle grip 111. In some embodiments, the extendable pull handle 401 and the handle grip 111 can be connected by other suitable means such as screws, latches, etc. In some embodiments, the handle cap 405 can include a tracking device (e.g., a radio frequency RF identifier) therein for security purposes. FIG. 4 shows a handle assembly 400 with a single telescoping part. In certain embodiments, frame assembly 100 may be provided with a double pull trolley 1000, such as shown in FIG. 10.

Figure 5:
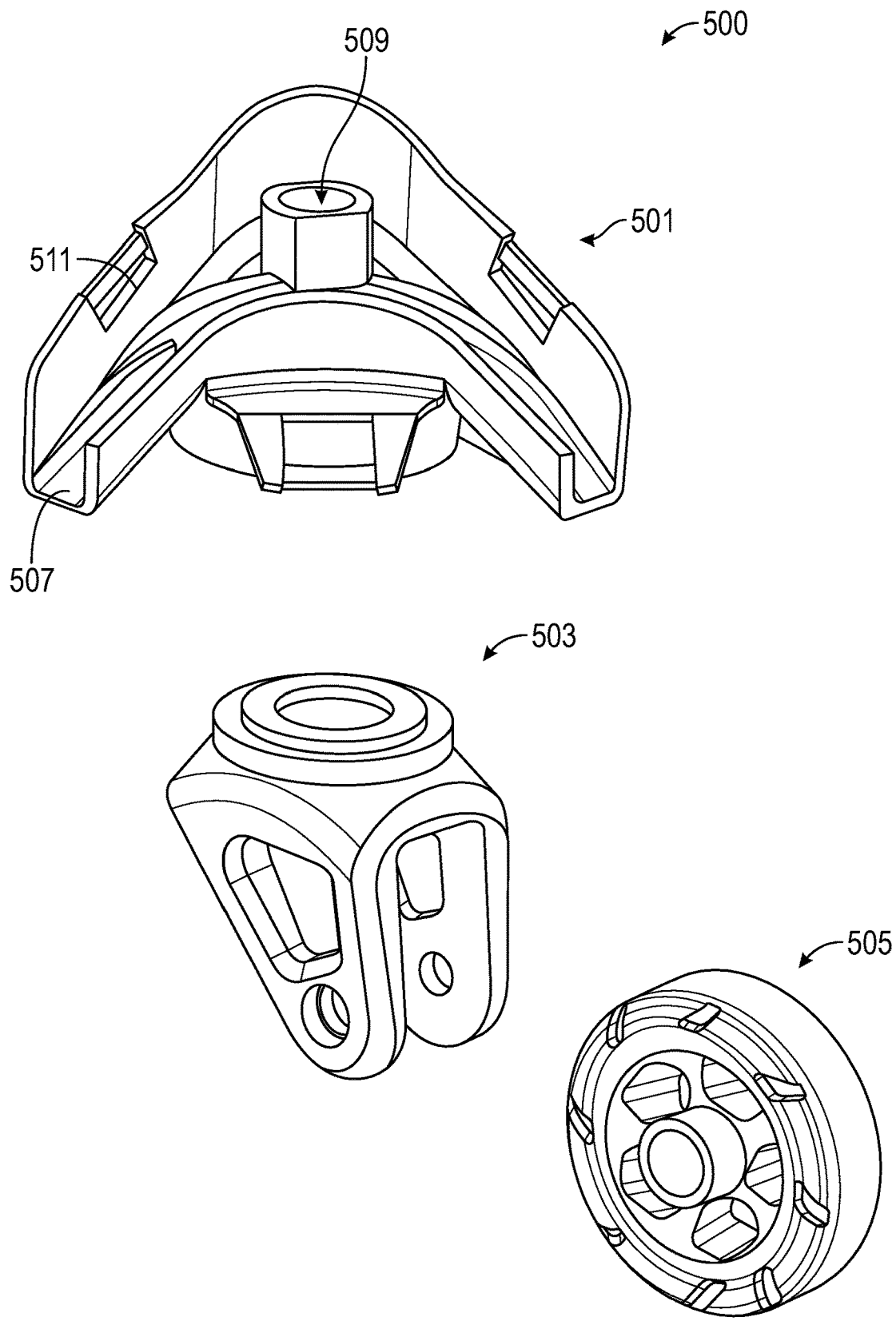
FIG. 5 is an exploded, isometric view of a wheel assembly in accordance with embodiments of the present technology.

FIG. 5 is an exploded, isometric view of a wheel assembly 500 in accordance with embodiments of the present technology. The wheel assemblies described above, such as 113, 115, 303, and 305, may be constructed similar to the exemplary wheel assembly 500 described herein. The wheel assembly 500 includes an external frame mount 501, a wheel connector 503, and a wheel 505. The external frame mount 501 is configured to support the bottom support structure 101 and couple to the wheel 505 by the wheel connector 503. The wheel connector 503 is coupled to the mount 501 by a conventional joint to allow the wheel to rotate with respect to the frame. In the illustrated embodiment, the external frame mount 501 includes a hole 509, such as the aforementioned blind hole, for receiving the generally vertical portion at the bottom of the diagonal portion 1072 of the diagonal support structure 107. In such embodiments, the external frame mount 501 performs functions similar to those of the front wheel assemblies 303 shown in FIG. 3. The external frame mount 501 and hole 509 may, in certain embodiments be separate from the wheel assemblies.

In some embodiments, however, the external frame mount 501 can be formed without the hole 509 and supports the bottom support structure 101 only. In such embodiments, the external frame mount 501 performs functions similar to those of the back wheel assemblies 305 shown in FIG. 3. However, for convenience, the front and back wheel assemblies 303 and 305 are envisioned to be formed from the same mold, such as the mold to form wheel assembly 500.

Figure 6:
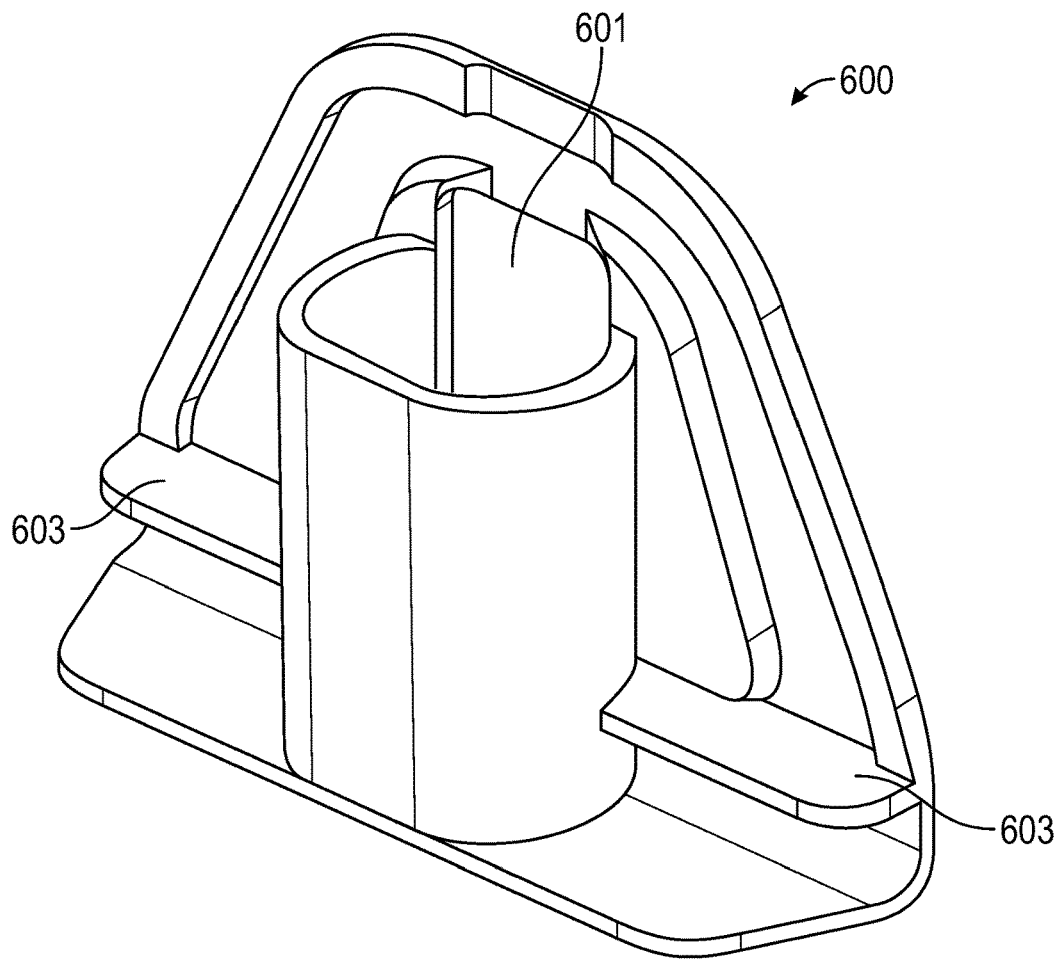
FIG. 6 is an isometric view of a bottom molded piece in accordance with embodiments of the present technology.

FIG. 6 is an isometric view of a bottom molded piece 600 in accordance with embodiments of the present technology. The bottom molded piece 600 is formed with a tube structure 601 for receiving the bottom end 1032 of the handle housing 103. On each sides of the tube structure 601, a guiding plate 603 can be formed so as to guide and hold an end of the bottom support structure 101 (see FIG. 7).

Figure 7:
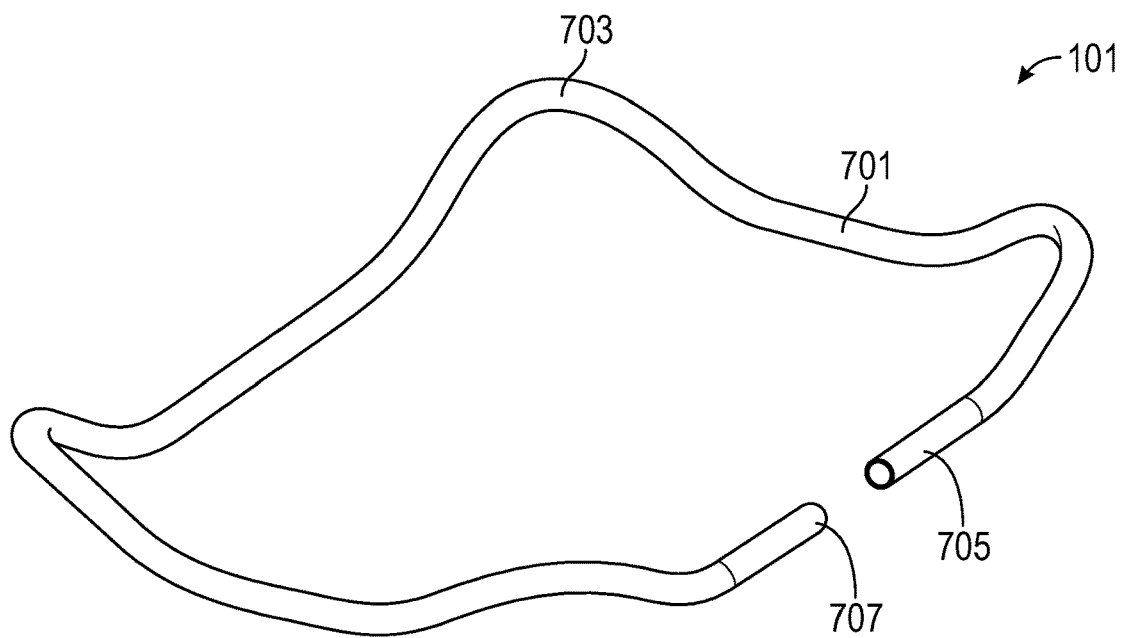
FIG. 7 is an isometric view of a bottom support structure in accordance with embodiments of the present technology.

FIG. 7 is an isometric view of the bottom support structure 101 in accordance with embodiments of the present technology. As shown, the bottom support structure 101 can include a first end 705 and a second end 707. The first and second ends 705, 707 are configured to be in contact with the guiding plates 603, such that the bottom support structure 101 can be coupled to the bottom molded piece 600. In some embodiments, the first and second ends 705, 707 can be further secured to the guiding plates 603 by suitable means such as screw, latches, etc.

Figure 8:
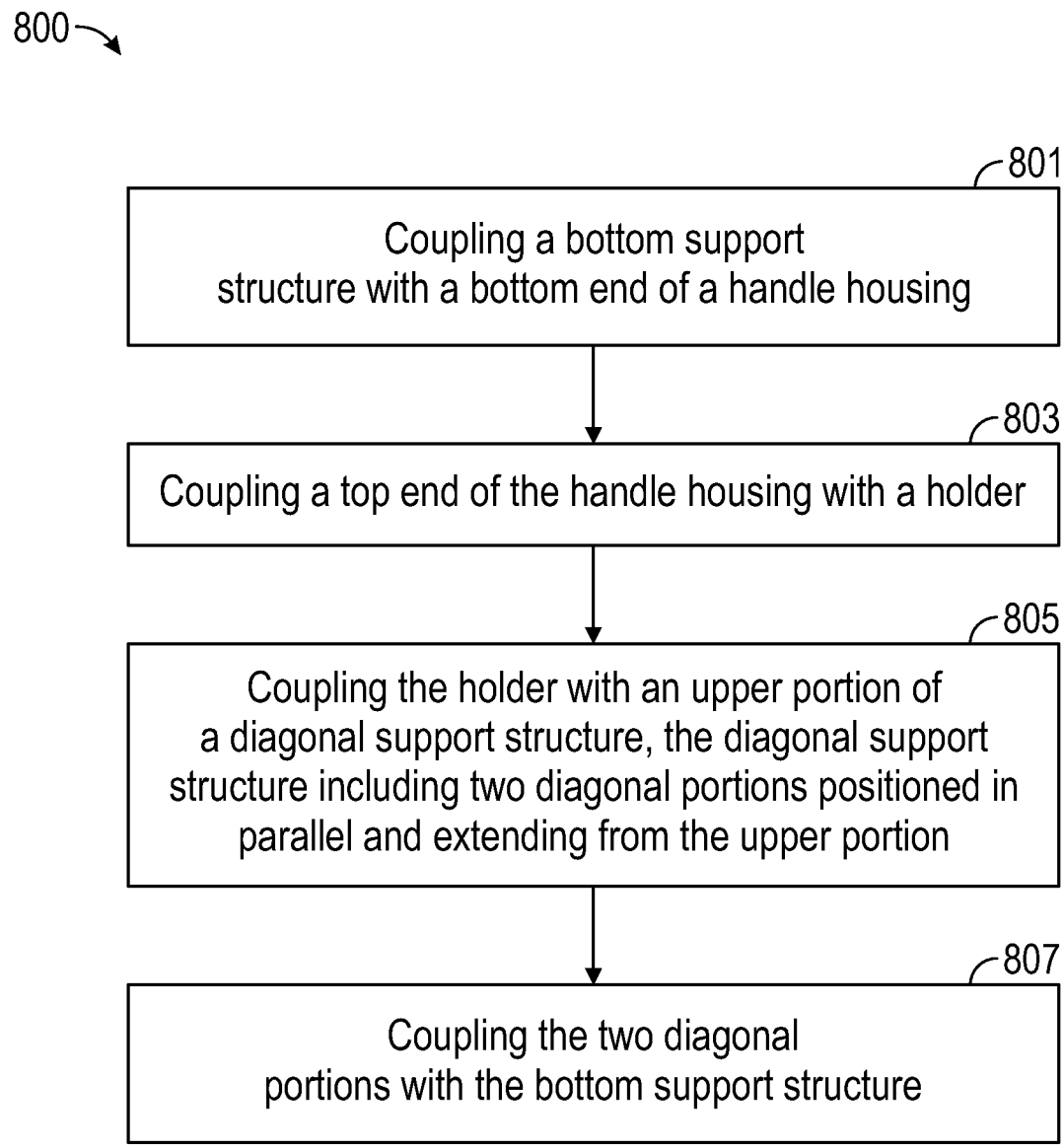
FIG. 8 is a flow diagram showing a method for assembling the frame assembly in accordance with embodiments of the present technology.

FIG. 8 is a flow diagram showing a method 800 for assembling a frame assembly in accordance with embodiments of the present technology. At block 801, the method starts by coupling a bottom support structure with a bottom end of a handle housing. In some embodiments, the handle housing and the bottom support structure can be coupled by a bottom molded piece (e.g., the bottom molded piece 600).

At block 803, the method 800 continues by coupling a top end of the handle housing with a holder. In some embodiments, the holder can include an aperture allowing the handle housing to pass through and accordingly holding the handle housing.

At block 805, the method 800 continue to couple the holder with an upper portion of a diagonal support structure. In some embodiments, the holder can include a recess to hold and clip the upper portion of the diagonal support structure. The diagonal support structure includes two diagonal portions positioned in parallel and extending from the upper portion toward the bottom support structure.

At block 807, the method 800 continues by coupling the two diagonal portions with the bottom support structure. In some embodiments, the two diagonal portions with the bottom support structure can be coupled by an external frame mount (e.g., the external frame mount 501).

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A frame assembly comprising:
   a bottom support structure having a front side and a back side;
   a handle housing having a top end and a bottom end, the bottom end being coupled to the bottom support structure at the back side thereof;
   a holder coupled to the top end of the handle housing; and
   a diagonal support structure diagonally positioned and coupled to the handle housing via the holder and coupled to the bottom support structure at the front side thereof,
   wherein the bottom support structure, which is a tubular frame part, includes at least one curved portion, and includes a flat portion configured to be positioned closer to a floor surface than the at least one curved portion.

2. The frame assembly of claim 1, wherein the handle housing, the holder, and the diagonal support structure together form an integrated structure.

3. The frame assembly of claim 1, further comprising:
   two back wheel assemblies coupled to the back side of the bottom support structure.

4. The frame assembly of claim 3 further comprising:
   two front wheel assemblies coupled to the front side of the bottom support structure.

5. The frame assembly of claim 3, wherein the at least one curved portion includes two curved portions, and each of the two curved portions is oriented over one of the two back wheel assemblies.

6. The frame assembly of claim 1, further comprising:
   an extendable pull handle at least partially positioned in the handle housing.

7. The frame assembly of claim 6, further comprising:
   a handle grip coupled to the extendable pull handle.

8. The frame assembly of claim 6, wherein the holder includes an aperture, and wherein the extendable pull handle is positioned to pass through the aperture.

9. The frame assembly of claim 1, wherein the holder includes a recess configured to accommodate an upper portion of the diagonal support structure.

10. The frame assembly of claim 1, wherein the at least one curved portion is configured to couple to a wheel assembly.

11. The frame assembly of claim 1, further comprising:
    a bottom molded piece positioned to couple the bottom support structure and the handle housing.

12. The frame assembly of claim 11, wherein the bottom support structure is a single-piece bottom support structure.

13. The frame assembly of claim 12, wherein the single-piece bottom support structure includes two ends, and wherein the two ends are coupled to opposed sides of the bottom molded piece.

14. The frame assembly of claim 1, wherein the diagonal support structure is a single-piece diagonal support structure, wherein the single-piece diagonal support structure includes a first end and a second end, and wherein the first end is coupled to a first wheel assembly, and wherein the second end is coupled to a second wheel assembly.

15. The frame assembly of claim 1, wherein diagonal support structure includes an upper portion and two diagonal portions, wherein the upper portion of the diagonal support structure is generally flush with a top surface of the holder, and wherein the two diagonal portions of the diagonal support structure are positioned in parallel and extending from the upper portion toward a front side of the bottom support structure in a diagonal direction.

16. The frame assembly of claim 1 wherein the diagonal support structure comprises a horizontal portion that traverses a width of the frame assembly and bends at a plurality of corners from the horizontal portion to a diagonal portion.

17. The frame assembly of claim 16 wherein each of the plurality of corners comprises a corner protector.

18. The frame assembly of claim 17 wherein each corner protector comprises a vertical socket to receive a rear vertical frame support extending from the bottom support structure to the vertical socket.

19. The frame assembly of claim 1 wherein bottom support structure is planar.

20. The frame assembly of claim 1 wherein the handle housing is a double pull trolley.

21. The frame assembly of claim 1, wherein the at least one curved portion is curved both in a horizontal plane parallel with the floor surface, and in a vertical plane perpendicular to the floor surface and the horizontal plane.

22. The frame assembly of claim 1, wherein the at least one curved portion extends from the flat portion, such that the bottom support structure is a single-piece bottom support structure.

23. A method for assembling a frame assembly, the method comprising:
    coupling a bottom support structure with a bottom end of a handle housing;
    providing an extendable pull handle at least partially positioned in the handle housing;
    coupling a top end of the handle housing with a holder;
    coupling the holder with an upper portion of a diagonal support structure, the diagonal support structure including two diagonal portions positioned in parallel and extending from the upper portion toward the bottom support structure and the upper portion of the diagonal support structure traverses a width of the frame assembly;
    coupling a handle grip to the extendable pull handle, wherein a top surface of the holder is generally flush with the handle grip;
    coupling the two diagonal portions with the bottom support structure; and
    coupling the holder with the upper portion of the diagonal support structure includes accommodating the upper portion of the diagonal support structure in a recess formed in the holder such that the upper portion of the diagonal support structure is flush with a top surface of the holder.

24. The method of claim 23, further comprising forming an integrated structure together by the handle housing, the holder, and the diagonal support structure.

25. A frame assembly comprising:
    a bottom support structure having a front side and a back side;
    a handle housing having a top end and a bottom end, the bottom end being coupled to the bottom support structure at the back side thereof;
    a holder coupled to the top end of the handle housing;
    a front wheel stability transference structure positioned and coupled to the handle housing via the holder and coupled to the bottom support structure at the front side thereof; and
    a bottom molded piece which couples the bottom support structure and the handle housing, wherein the bottom support structure is a tubular single-piece bottom support structure including two ends, and the two ends are coupled to opposed sides of the bottom molded piece.

26. The frame assembly of claim 25 wherein the front wheel stability transference structure extends from the handle housing a width of the frame assembly, a length of the frame assembly, and a height of the frame assembly.

27. The frame assembly of claim 26 wherein the front wheel stability transference structure comprises a diagonal portion that extends the length and the height of the frame assembly.

28. The frame assembly of claim 26 wherein the front wheel stability transference structure comprises a horizontal portion that extends the width of the frame assembly and a vertical portion that extends the height of the frame assembly.

29. The frame assembly of claim 25, further comprising two wheel assemblies coupled to the single-piece bottom support structure.

30. The frame assembly of claim 25, further comprising at least one guiding plate fixed with the bottom molded piece, wherein the at least one guiding plate holds the two ends of the single-piece bottom support structure such that the bottom support structure is coupled to the bottom molded piece.

* * * * *